H. K. SANDELL.
AUTOMATIC CURRENT REVERSING MECHANISM.
APPLICATION FILED MAY 1, 1914.

1,208,386.

Patented Dec. 12, 1916.
2 SHEETS—SHEET 1.

Witnesses:

Inventor:
Henry K. Sandell,
By Dyrenforth, Lee, Chritton & Wiles,
Attys.

H. K. SANDELL.
AUTOMATIC CURRENT REVERSING MECHANISM.
APPLICATION FILED MAY 1, 1914.

1,208,386.

Patented Dec. 12, 1916.
2 SHEETS—SHEET 2.

Witnesses:
Inventor:
Henry K. Sandell,

UNITED STATES PATENT OFFICE.

HENRY K. SANDELL, OF CHICAGO, ILLINOIS, ASSIGNOR TO HERBERT S. MILLS, OF CHICAGO, ILLINOIS.

AUTOMATIC CURRENT-REVERSING MECHANISM.

1,208,386.  Specification of Letters Patent.  Patented Dec. 12, 1916.

Application filed May 1, 1914. Serial No. 835,645.

*To all whom it may concern:*

Be it known that I, HENRY K. SANDELL, a citizen of the United States, residing at Chicago, in the county of Cook and State of Illinois, have invented new and useful Improvements in Automatic Current-Reversing Mechanism, of which the following is a specification.

My invention relates to certain new and useful improvements in automatic current reversing mechanism, and is fully described and explained in the specification and shown in the accompanying drawings, in which—

Figure 1:
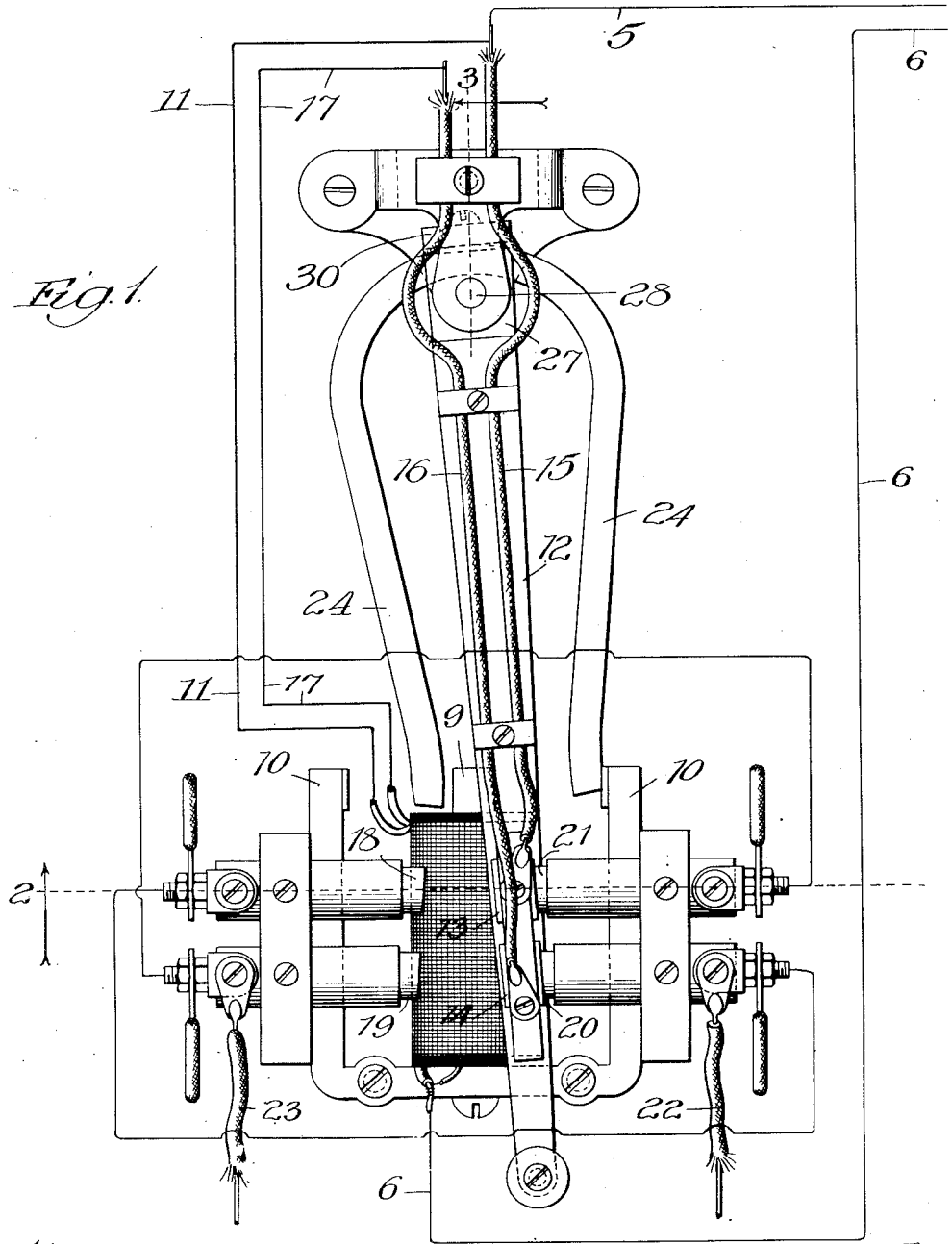
Figure 2:
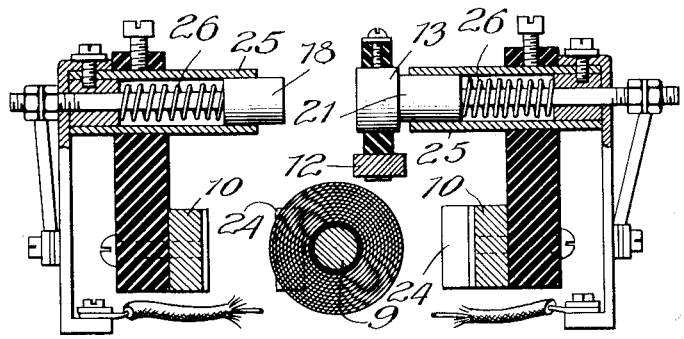
Figure 3:
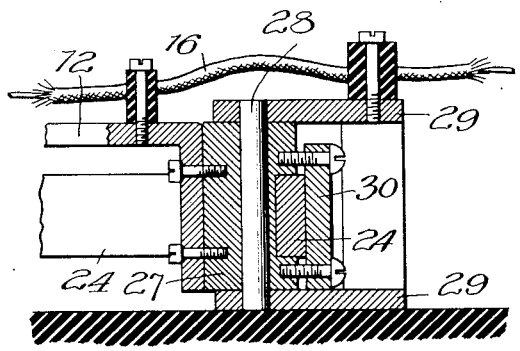
Figure 4:
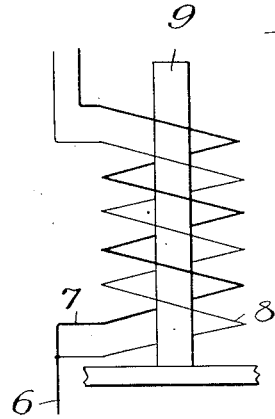

Figure 1 is a front elevation of my improved device; Fig. 2 is a section on line 2 of Fig. 1; Fig. 3 is a section on the line 3 of Fig. 1, and Fig. 4 is a circuit diagram of the magnet.

The present structure is particularly designed for constantly transforming the current which may from time to time change its polarity, into a current of constant direction. It is not a rectifier in the sense that it is intended to transform an alternating current which has frequent reversals, but is rather intended for use where there is a source of current supply whose polarity may be changed from time to time, the changes being separated by considerable intervals. It was initially devised for use in connection with a rectifier of my invention, a form of which is shown in my application filed March 3, 1914, Serial No. 822,135. When that rectifier is started, while it will produce direct current, the current may flow in either direction. By interposing the present structure in the direct current lead wires therefrom, the current will necessarily flow always in the same direction. Furthermore, should the device get out of step for any reason, so as to produce changes in the direction of the current flow, the present device is designed instantly to compensate for the change. In other words, while the present structure is not adapted for rectifying a rapidly alternating current, it will rectify a current with infrequent alternations. It is also advantageous in that if used for supplying such circuits as have counter-electro-motive force, such as storage batteries, if the charging circuit be broken as by stopping the charging dynamo, or rectifier, the device will break the circuit, so that the reverse flow from the battery will not take place. The means whereby these several objects are accomplished will become clear from the description of the structure.

Referring to the drawings, 5 and 6 are line wires which supply the current to be controlled by my novel device. It is to be understood that this is a current which may from time to time change its direction of flow. The line wire 6 is led to the termini of a series winding 7 and a shunt winding 8 on a compound wound electro-magnet whose core is indicated by the character 9, and which is provided with auxiliary pole-pieces 10 at the two sides thereof. The shunt winding is connected by a lead 11 with the opposite line wire 5 so as to close the circuit therethrough. The electro-magnet is thus energized by the shunt winding as long as current flows through the line wires 5 and 6, its polarity depending upon the direction of current flow.

12 is a swinging arm pivoted above the plane of the electro-magnet and carrying contacts 13 and 14 which are connected by leads 15 and 16, respectively with the line wire 5 and a wire 17 which runs to the opposite terminal of the series winding of the electro-magnet from that to which the line wire 6 is attached.

18, 19, 20 and 21 are four stationary contacts in position to engage with the contacts 13 and 14 on the swinging arm 12 as the arm swings from side to side. The contacts 18 and 20 are electrically connected with each other, as are the contacts 19 and 21, and the current leads from the controller, or reverser, which are indicated in the drawings by the characters 22 and 23, are respectively attached to the contacts 19 and 20. It will thus be seen that when the swinging arm is in the right-hand position, as in Fig. 1, the line wire 5 is in electrical connection through the wire 15, and the contacts 13 and 21 with the outlet lead 23, and the line wire 6 is in electrical connection through the series winding of the electro-magnet, the wires 17 and 16, and contacts 14 and 20 with the lead-out wire 22. When the arm is swung to the left, however, the contact 13 strikes the contact 18 while the contact 14 strikes the contact 19, thus reversing the connections and securing an electrical flow from the lead-in wire 5 to the lead-out wire 22, and from the lead-in wire 6 to the lead-out wire 23. During all this flow the electro-magnet is energized by current flowing through its shunt winding, and if the lead-out wires 22 and 23 are in communication, as through a translator of any sort, then current also flows through the series winding of the electro-magnet in an obvious manner.

The swinging arm 12 carries a horse-shoe magnet 24 whose poles lie on the two sides of the core 9 of the electro-magnet and between the same and the auxiliary pole-pieces 10. Now, it will be obvious that as long as the electro-magnet is energized by a current producing the desired polarity, the swinging arm will be held permanently in one position, one pole of the horse-shoe magnet being attracted toward the core 9 and repelled by the adjacent pole-piece 10, while the other pole of the horse-shoe magnet will be repelled by the core 9 and attracted by the adjacent pole-piece 10. Should the current be suddenly reversed, in the circuit-supplying the line wires 5 and 6, the polarity of the pole 9, and pole-pieces 10 will instantly reverse, and the horse-shoe magnet will swing to a symmetrical position on the opposite side, carrying with it the swinging arm 12 and reversing the electrical connections as hereinbefore described, so that the direction of flow in the circuit supplied by the lead-out wires 22 and 23 will remain constant.

The operation of the present device is, of course, entirely automatic, and so rapid that there is only a brief break in the circuit in the lead-out wires. But as heretofore stated, the action is not sufficiently rapid to rectify an alternating current as ordinarily understood, but it does satisfactorily rectify occasional reversals of current flow in an entirely satisfactory manner. Furthermore, if the line wires 5 and 6 are supplied by a device which may furnish current of either polarity, then the present device instantly adjusts itself and transmits only current of predetermined polarity. It will also be seen that if the line wire circuit is broken, there is no chance for a backward flow through the lead-out wires 22 and 23, as would occur if a storage-battery were being charged. In this case the swinging arm moves by gravity away from the stationary contact points immediately upon the break of the line current, and the circuit cannot be reestablished until sufficient current again flows in through the line wires to energize the electro-magnet and draw the swinging arm to one side.

The foregoing description sets forth the general principles of the operation, which I have not complicated by referring to details of construction.

Fig. 2 shows the details of two of the stationary contact points, which it will be noted are mounted in barrels 25 and pressed outwardly by springs 26, so that, when the swinging arm moves over, it finds laterally yielding contacts.

Fig. 3 shows the details of the mounting of the swinging arm. 27 is a sleeve mounted on a pin 28 carried by stationary brackets 29. The arm 12 has a down-turned end which is secured to one face of the sleeve 27, and the electro-magnet lies underneath the arm, surrounds the sleeve 27 and is held in place by a clamping-plate 30 secured to the said sleeve.

I realize that considerable variation is possible in the details of the construction herein set forth, and therefore, by having specifically described the same, I do not intend to be limited thereto, except as pointed out in the following claim in which it is my intention to set forth all the novelty inherent in the construction described, as broadly as is permitted by the state of the art.

What I claim as new and desire to secure by Letters Patent is—

In combination, a pivoted arm, a horse-shoe magnet carried thereby, an electro-magnet having a central pole and auxiliary pole-pieces at the sides thereof whereby each pole of the horse-shoe magnet lies between the pole-piece and an auxiliary pole-piece of the electro-magnet, stationary pole-changer contacts and contacts to coöperate therewith on the swinging arm, feed wires of varying polarity, and lead-out wires connected to pole-changer contacts, and connections between the feed-wires and the electro-magnet to change the polarity thereof with changes in the feed wire circuit.

HENRY K. SANDELL.

In presence of—
NELLIE B. DEARBORN,
OTTILIE C. AVISUS.